UNITED STATES PATENT OFFICE.

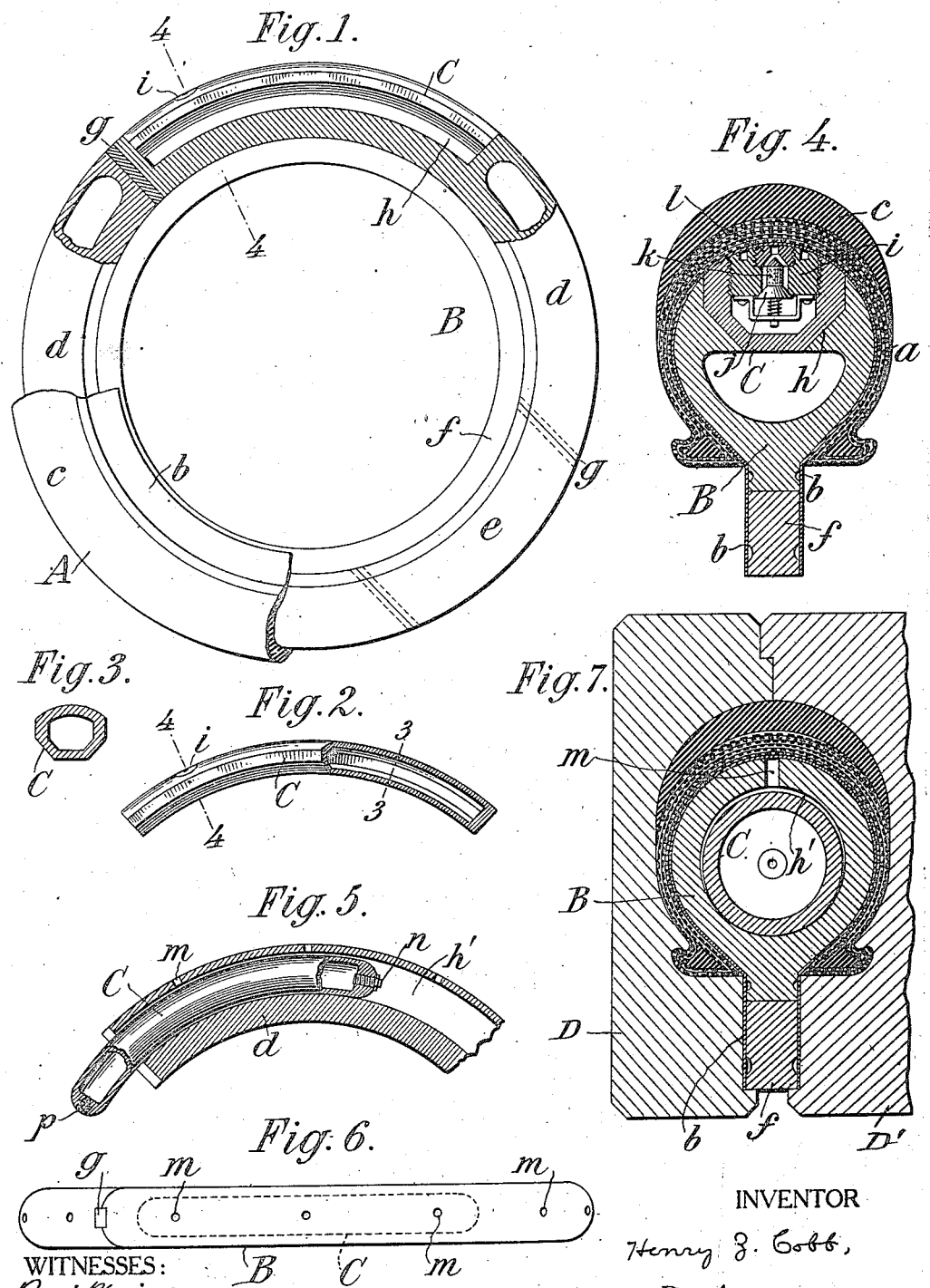

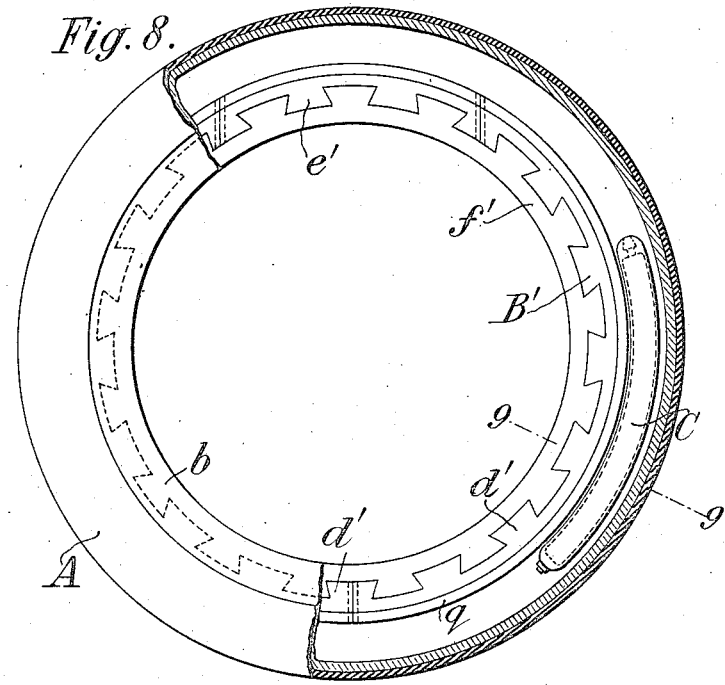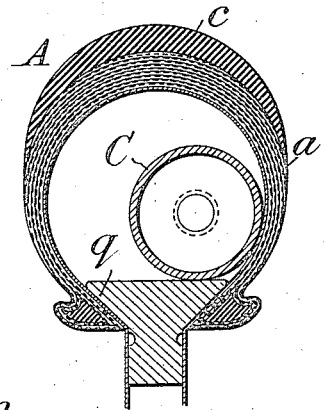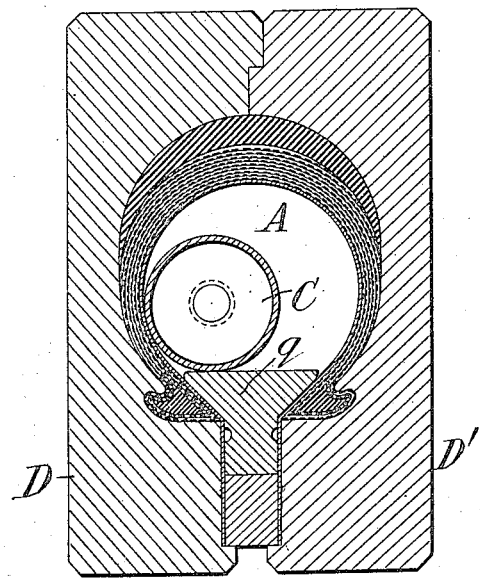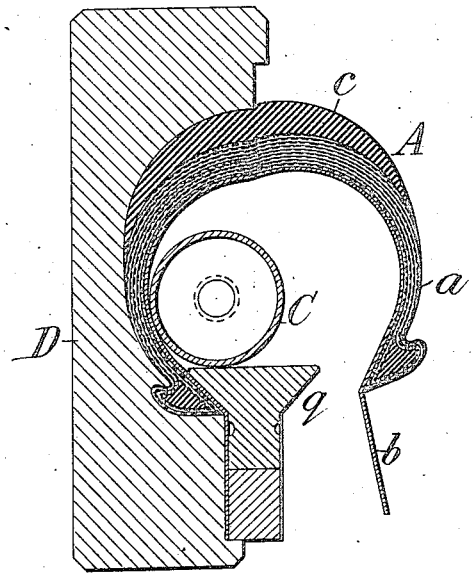

HENRY Z. COBB, OF WINCHESTER, MASSACHUSETTS, ASSIGNOR TO UNITED STATES RUBBER COMPANY, OF NEW BRUNSWICK, NEW JERSEY, A CORPORATION OF NEW JERSEY.

APPARATUS FOR VULCANIZING TIRE-SHOES.

1,214,277.

Specification of Letters Patent. Patented Jan. 30, 1917.

Application filed March 6, 1915. Serial No. 12,645.

*To all whom it may concern:*

Be it known that I, HENRY Z. COBB, a citizen of the United States of America, residing at Winchester, in the county of Middlesex and State of Massachusetts, have invented certain new and useful Improvements in Apparatus for Vulcanizing Tire-Shoes, of which the following is a specification.

In the making of shoes or casings for pneumatic vehicle tires, particularly those for automobiles, it is desirable to hold the tire shoe expanded within the vulcanizing mold by subjecting it to an internal fluid pressure. This has been proposed to be done by connecting the interior of the shoe in each mold with a source of fluid pressure, such as a steam boiler or a compressed air tank, by means of suitable pipes and couplings, so that the fluid pressure can be introduced into the cavity or hollow of each tire shoe after the mold is closed upon it, and a series of such molds are clamped together in the vulcanizing chamber. A much more convenient and desirable method is that set forth in my application No. 848,766 filed July 3, 1914, in which there is provided for each individual shoe its own source of fluid pressure, which pressure is liberated within the shoe after the shoe is confined in its mold and preferably by thermostatic means, so that the liberation of pressure occurs after the application of heat and before the heat has risen to such point as to cause any substantial degree of vulcanization. Such process has the advantage that no pipes or couplings are required leading into the vulcanizing chamber from an outside source of pressure and requiring a separate connection to the individual molds or mandrels; and that any accidental leakage from any one mold can affect only the shoe in that mold and will not bring about defects in the other shoes undergoing vulcanization at the same time; and also that when tire shoes of different sizes or thicknesses, or different compositions, are being vulcanized in the same operation, they may be charged with fluid under different pressures.

My present invention provides an improved apparatus for performing the vulcanizing of tire shoes according to the method set forth in my said application. The means described in that application for practising the said method comprises a mandrel on which the tire shoe may be built up, and which remains within the shoe during vulcanization; and this mandrel has one or more chambers or cavities in which the source of fluid pressure, such as compressed air, is stored, the cavity being charged with such pressure previous to the building up of the shoe thereon, and pressure being liberated therefrom in the early part of the vulcanizing operation by thermostatic means, such as a fusible plug or a thermostatically operated valve. The preferred construction of such mandrel is set forth in my application No. 848,767 filed July 3, 1914.

According to my present invention the source of fluid pressure is contained in a separate reservoir or vessel distinct from the mandrel, and which vessel is to be placed within the tire shoe at or before the time when the latter is put into the vulcanizing mold. Such separate vessel is necessarily of such size and shape as to be contained or inclosed within the walls of the tire shoe during the vulcanization thereof. It may be associated with a mandrel which remains within the shoe during the vulcanizing; or it may be wholly independent of such mandrel, so that the shoe after being built up on a mandrel in the usual way may be removed therefrom and inserted in the vulcanizing mold, the vessel being first placed in its cavity. The pressure vessel or reservoir is charged before each use with a suitable source of fluid pressure, such as a given quantity of water or other liquid vaporizable under the heat of vulcanization, so as to generate sufficient vapor to create the requisite vapor tension or pressure within the tire shoe; or it may be charged with compressed air or other gas at a suitable pressure. It must be provided with some means for liberating the pressure to distend the tire shoe within its mold in the early part of the vulcanizing operation. This means is preferably thermostatic, so that it opens automatically during the heating up of the mold in the early part of the vulcanizing process.

The accompanying drawings show several different ways of applying my present invention.

Figure 1 is a side elevation, partly in section, of a mandrel or core showing a fragment of the shoe thereon. Fig. 2 is a side elevation, partly in section, of the vessel removed from the mandrel. Fig. 3 is a cross-section of the vessel shown on a larger scale, on the line 3—3 in Fig. 2. Fig. 4 is a cross-section on a still larger scale, on the line 4—4 in Figs. 1 and 2. Fig. 5 is a fragmentary section of part of the mandrel showing a different construction, the vessel being partly removed therefrom and partly in section. Fig. 6 is an edge view of the complete mandrel of Fig. 5, the vessel within it being indicated in dotted lines. Fig. 7 is a cross-section on a larger scale of the mandrel and vessel of the construction shown in Figs. 5 and 6, with the shoe on the mandrel and both inclosed in the mold for vulcanizing. Fig. 8 is an elevation of a tire shoe and supporting ring showing still another construction. The parts are shown ready to be placed within a vulcanizing mold. Fig. 9 is a cross-section on a larger scale in the plane of the line 9—9 in Fig. 8. Fig. 10 is a similar cross-section showing the parts inclosed in the mold. Fig. 11 shows one-half of the mold removed and the shoe partly opened.

In the several figures, A designates the tire, or more correctly, the tire shoe, which is shown as of the usual clencher type having a fabric portion $a$, rubber lining $b$ and an outer cushion $c$ of rubber or rubber composition.

B is, as a whole, the mandrel on which the tire shoe is or may be built up, and which may be used for supporting the shoe during vulcanizing.

C is a vessel independent of the mandrel and mold, and adapted to be placed within the hollow of the tire shoe during vulcanizing.

D, D' are the mold sections or halves.

The construction shown in Figs. 1, 2, 3 and 4 will be first described. The mandrel or core B may be of any suitable or known construction. That shown comprises a segmental or sectional core having two main segments $d$, $d$ and a key segment $e$ as usual, and within them a complete ring $f$ to which the segments are attached in any suitable or known manner (not shown). Where the segments abut they are held in alinement by suitable dove-tails or key pieces $g$, or in any other suitable manner. One of the segments $d$ has a deep groove or channel $h$ in its peripheral portion, into which fits the vessel C. The vessel and mandrel segment should be so conformed to each other as to afford, when the vessel is in place, a continuous or uninterrupted outer surface, this being desirable in order that the mandrel may be used as the support upon which to build up the shoe. This is conveniently accomplished by giving the vessel the cross-section shown in Fig. 3, and by forming the mandrel with its channel $h$ of corresponding section, so as to freely receive the vessel. The vessel has any suitable means whereby it may be charged with pressure or with a source of pressure, and whereby the pressure may be liberated within the tire shoe during vulcanizing. As stated in my said previous application, such provisions may include a filling or charging valve and a fusible plug adapted to melt out under the vulcanizing temperature; or instead, a thermostatically operated valve may be provided which will open at the vulcanizing temperature or a temperature approaching it. The latter construction is shown in Fig. 4, wherein a plug $i$ is screwed into the vessel and carries a check valve $j$ which is opened by the expansion of a thermostatic plug $k$ which reacts against an outer screw plug or cap $l$. The vessel may be charged by unscrewing this outer plug, and screwing in a pump nipple, pumping up and then replacing the plug. In vulcanizing, the expansible member $k$ unseats the valve when the prescribed temperature is reached, and permits the confined pressure to escape to the space between the shoe lining and the mandrel to distend the shoe outwardly into close contact with its mold.

In the use of this construction the mandrel is assembled; the vessel C is charged with pressure and is seated in the channel $h$; and the shoe is built up in the usual manner upon the mandrel. The mold sections D D' are then applied and this mold, with other molds, are placed in the vulcanizer, the mold sections being clamped together in any suitable manner, as by the usual hydraulic ram. The lining rubber $b$ is prolonged inwardly, so that it covers the joints between the core segments and the inner ring $f$ and serves as a packing between a flat neck portion of the mandrel and the flat embracing portions of the mold sections, as clearly shown in Figs. 7 and 10. The vulcanizer is then heated by steam, or otherwise, and before the temperature rises high enough to cause any material vulcanization, the thermostatic valve $k$ is opened by the heat, and the pressure escapes from the vessel into the shoe wherein it is confined by the lining, and so that it expands the shoe, separating it from the mandrel and pressing it outwardly against the inner face of the mold so that in vulcanizing the plastic rubber of the tread cushion $c$ enters into any interstices of the mold, such as for forming anti-skid projections. The charge of fluid under pressure is such that the pressure under the vulcanizing heat is sufficient to stretch the fabric layers, whereby to avoid any wrinkling of the fabric and also to press the rubber into all the cavities of the mold, and thereby produce a perfectly molded shoe.

In the construction shown in Figs. 5, 6 and 7, the mandrel or core segment *d* has a channel or chamber *h'* formed within it and opening at an end of the segment; and the vessel C is of such shape that it may be freely entered endwise into such chamber. In Fig. 5 it is shown in the act of entering. In Fig. 6 it is shown in dotted lines in place in the assembled mandrel. In Fig. 7 it is shown in cross-section in its place therein. To enable the liberated fluid to pass from the chamber *h'* to the exterior of the mandrel, the latter is formed with peripheral holes *m m* at intervals. In Fig. 5 the vessel C is shown as formed with a charging valve *n* at one end, and a fusible plug *p* at the other end. This plug may be of a wax or of a fusible alloy, so that in either case it fuses at the desired temperature. With this construction the operation is the same as already described, except that the vessel C has to be introduced before the mandrel is assembled.

The construction shown in Figs. 8 to 11 is somewhat different. With this construction one mandrel is used for building up the shoe, and another mandrel or skeleton core is used for vulcanizing. The latter only is shown, the former being of any suitable or known construction. For example, the construction shown in Fig. 1 or Fig. 6 would answer for building up the shoe. When the shoe has been built up on the mandrel, the latter is removed in the usual way and the skeleton core or mandrel, shown best in Fig. 8, is introduced in its place. This skeleton mandrel is lettered B'. Its construction may be precisely the same as that described with reference to Fig. 1, except that the greater part of the core portion within the hollow of the tire shoe is omitted, only that portion being retained which is adjacent to the neck or flat-cheeked inner portion of the mandrel, being the flaring portion *q* adjacent to the clencher ribs on the margins of the shoe. The skeleton mandrel shown is made up as usual of main segments *d' d'*, and the key segment *e'*, these being united by an inner ring *f'* which engages the segments in any usual or suitable manner. The interengaging construction shown in Fig. 8 comprises interfitting dove-tails on the ring and segments respectively, these being of the construction set forth and claimed in my said prior application No. 848,767. The vessel C is or may be similar to that shown in Fig. 5, being, however, preferably of smaller diameter, and if necessary, greater length. It is shown as a cylindrical vessel curved to conform to the curve of the tire shoe and so as to enter freely within the hollow of the shoe.

In operating with this construction the tire shoe is built up in the usual manner upon a core or mandrel, its inner lining *b* being prolonged inwardly, as before described. The mandrel is then removed from the shoe. The vessel C is then inserted in the shoe and the skeleton mandrel B' is applied therein, the shoe being opened out for these purposes, as indicated in Fig. 11. The shoe is then placed in the mold, as shown in Fig. 10. When the mold sections are clamped together the lining *b* makes tight joints between the flat cheeks of the mold sections and the flat faces of the neck portion of the mandrel. The vulcanizing is then performed in the usual way. In the early part of the vulcanizing the wax plug melts out from the vessel and releases the charge of compressed fluid which thus is liberated directly within the hollow of the shoe and serves to distend the shoe within its mold to force its rubber cushion into exact conformance with the inner face of the mold, and to stretch the fabric layers and maintain them unwrinkled during vulcanizing, as before described.

If the vessel C is charged with water in suitable amount, the vulcanizing heat converts this into steam, which affords the fluid tension for distending the shoe. This or other vaporizable liquids may be used. Preferably, however, the vessel is charged with compressed air proportionately to the capacity of the vessel and the cubical contents of the hollow or free space within the shoe, to maintain within the latter during vulcanization the required pressure.

While it is preferable to use a mold, yet it is to be understood that my invention is applicable where the shoe during vulcanization is inclosed in any other envelop for resisting the internal pressure.

The invention is not confined to the use of thermostatic means for liberating the pressure from the vessel, as any other means may be provided which is adapted to act at any time after the shoe has been properly confined in its mold or other envelop, so that pressure cannot escape from within it, and before the vulcanizing operation has proceeded so far that the rubber has become materially vulcanized or set.

As the material for the fusible plug *p*, a fusible alloy of lead, tin and bismuth is suitable.

I claim as my invention:—

1. Vulcanizing apparatus comprising means adapted to inclose a tire shoe and confine pressure therein, and a vessel forming a portable unit and adapted to provide a source of fluid pressure, such vessel being adapted to be contained within the walls of the shoe and having means whereby the fluid pressure confined within it may be liberated within the shoe.

2. The combination with vulcanizing means adapted to inclose a tire shoe and confine pressure therein, of a vessel adapted to provide a source of fluid pressure, such vessel being of such size and shape as to be contained within the walls of the shoe, and having means whereby the fluid pressure confined within it may be liberated within the shoe during the vulcanizing operation.

3. The combination with vulcanizing means adapted to inclose a tire shoe and confine pressure therein, of a vessel adapted to provide a source of fluid pressure, such vessel being of such size and shape as to be contained within the walls of the shoe, and having thermostatic means adapted to open and liberate the confined pressure within the shoe upon the heating thereof in the course of the vulcanizing operation.

4. The combination with a vulcanizing mold adapted to inclose a tire shoe and confine pressure therein, of a vessel adapted to provide a source of fluid pressure, such vessel being of such size and shape as to be contained within the walls of the shoe, and having thermostatic means adapted to open and liberate the confined pressure upon the heating of the mold in the course of the vulcanizing operation.

5. The combination with vulcanizing means adapted to inclose a tire shoe and confine pressure therein, of a vessel adapted to provide a source of fluid pressure for use in vulcanizing a tire shoe, such vessel shaped and adapted to be contained within the walls of the shoe, and having thermostatic means adapted to open and liberate the confined pressure within the shoe upon the heating thereof in the course of the vulcanizing operation.

In witness whereof, I have hereunto signed my name in the presence of two subscribing witnesses.

HENRY Z. COBB.

Witnesses:
HORACE J. MARTIN,
HAROLD W. MARTIN.